(12) United States Patent
Kassner et al.

(10) Patent No.: US 10,286,812 B2
(45) Date of Patent: May 14, 2019

(54) VEHICLE SEAT WITH A ROLLER GUIDE

(71) Applicant: GRAMMER AG, Amberg (DE)

(72) Inventors: Dirk Kassner, Kummersbruck (DE); Norbert Lehner, Freihung (DE)

(73) Assignee: GRAMMER AG, Amberg (DE)

( * ) Notice: Subject to any disclaimer, the term of this patent is extended or adjusted under 35 U.S.C. 154(b) by 0 days.

(21) Appl. No.: 15/584,751

(22) Filed: May 2, 2017

(65) Prior Publication Data
US 2017/0320405 A1    Nov. 9, 2017

(30) Foreign Application Priority Data
May 3, 2016  (DE) .......................... 10 2016 108 159

(51) Int. Cl.
*B60N 2/07* (2006.01)
*B60N 2/50* (2006.01)
(Continued)

(52) U.S. Cl.
CPC ............ *B60N 2/07* (2013.01); *B60N 2/0747* (2013.01); *B60N 2/508* (2013.01); *F16C 29/04* (2013.01);
(Continued)

(58) Field of Classification Search
CPC .... F16C 29/04; F16C 29/045; F16C 29/2619; F16C 2202/08
See application file for complete search history.

(56) References Cited

U.S. PATENT DOCUMENTS

| 3,265,450 A | * | 8/1966 | Aho | ...................... F16C 29/045 104/135 |
| 4,914,712 A | * | 4/1990 | Ikimi | ...................... B66F 9/08 384/449 |

(Continued)

FOREIGN PATENT DOCUMENTS

| CN | 1730314 | 2/2006 |
| CN | 103863145 | 6/2014 |

(Continued)

OTHER PUBLICATIONS

Extended Search Report for European Patent Application No. 17166810.6, dated Sep. 28, 2017, 3 pages.
(Continued)

*Primary Examiner* — Nkeisha Smith
(74) *Attorney, Agent, or Firm* — Sheridan Ross P.C.

(57) ABSTRACT

The invention relates to a vehicle seat with a roller guide, wherein the roller guide has at least one at least partially laterally open guide rail and at least one running roller rolling in the guide rail and connected to parts of the vehicle seat by means of at least one axle, wherein the guide rail comprises a roller bottom-side inner wall arranged parallel to a central axis of the running roller, extending parallel thereto a roller top-side inner wall and a roller outer-side inner wall arranged perpendicularly to the central axis, wherein at least one lower transition inner wall is arranged between the roller bottom-side inner wall and the roller outer-side inner wall and at least one upper transition inner wall is arranged between the roller top-side inner wall and the roller outer-side inner wall, wherein the transition inner walls are configured free from a right-angled portion and in directions from the roller top-side inner wall and the roller bottom-side inner wall towards the roller outer-side inner wall are configured with a continuously reducing spacing from the central axis of the running roller, wherein on an (Continued)

axial loading of the roller guide in the direction of the central axis of the running roller, a lower portion of an outer end portion at a first end of the running roller configured to face the roller outer-side inner wall lies with contact against the lower transition inner wall.

12 Claims, 5 Drawing Sheets

(51) Int. Cl.
*F16C 29/04* (2006.01)
*B60N 2/04* (2006.01)
*F16C 29/06* (2006.01)

(52) U.S. Cl.
CPC .............. *F16C 29/045* (2013.01); *B60N 2/04* (2013.01); *B60N 2/50* (2013.01); *B60N 2205/20* (2013.01); *F16C 29/0619* (2013.01); *F16C 2202/08* (2013.01)

(56) References Cited

U.S. PATENT DOCUMENTS

| | | | | |
|---|---|---|---|---|
| 5,348,261 A * | 9/1994 | Nini | ...................... | B60N 2/0715 248/424 |
| 5,765,802 A * | 6/1998 | Bostrom | .............. | B60N 2/0825 248/419 |
| 6,200,032 B1 * | 3/2001 | Ropp | ...................... | B60N 2/502 384/47 |
| 6,264,180 B1 * | 7/2001 | Ropp | ...................... | B60N 2/502 248/157 |
| 6,866,236 B2 * | 3/2005 | Mullinix | ................ | B60N 2/501 248/421 |
| 9,079,512 B2 * | 7/2015 | Lehner | ................... | B60N 2/508 |
| 2009/0085452 A1 | 4/2009 | Rehage | | |

FOREIGN PATENT DOCUMENTS

| | | |
|---|---|---|
| CN | 104228617 | 12/2014 |
| CN | 105034861 | 11/2015 |
| CN | 104487282 | 6/2016 |
| DE | 102005005889 | 8/2006 |
| DE | 202007013640 U1 | 3/2009 |
| DE | 102006059088 | 2/2010 |
| DE | 102012019574 A1 | 2/2014 |
| DE | 102014005551 B3 | 8/2015 |
| EP | 1007385 B1 | 1/2002 |
| JP | 2011-043192 | 3/2011 |
| WO | WO 2010/071482 | 6/2010 |

OTHER PUBLICATIONS

Official Action for German Patent Application No. 102016108159.0, dated Feb. 15, 2018, 3 pages.
Search Report prepared by the German Patent Office dated Dec. 7, 2016, for German Patent Application No. 10 2016 108 159.0.
Official Action with English Translation for China Patent Application No. 201710294228.X, dated Dec. 7, 2018, 10 pages.

* cited by examiner

VEHICLE SEAT WITH A ROLLER GUIDE

CROSS-REFERENCE TO RELATED APPLICATIONS

This application claims the benefit of German Patent Application No. DE 10 2016 108 159.0 filed May 3, 2016, the entire contents of which are incorporated herein by reference.

FIELD

The invention relates to a vehicle seat with a roller guide, wherein the roller guide comprises at least one at least partially laterally open guide rail and at least one running roller rolling in the guide rail and connected to parts of the vehicle seat by means of at least one axle, according to the preamble of claim 1.

BACKGROUND

Roller guide systems for vehicle seats are used in particular with scissor frames, the rollers of which move, as the vehicle seat moves up and down, within a guide rail in a forward and backward direction. In order to prevent blocking between the inner walls of the guide rail and the running roller (hereinafter also called "roller"), such roller guide systems are often provided with relatively large play in the radial direction, for example, above all in the direction in which the weight force of a seat occupant acts, and in the axial direction, that is, in the direction of a central axis of the roller. However, this leads to relatively loud noises (rattling) when the seat is used, which is perceived by seat occupants as disadvantageous and disturbing.

Particularly in the presence of a load in the axial direction of the running roller, that is, an axial load, the risk of loud noises exists. This is the case when the vehicle seat is subject to a loading in the direction of the central axis of the roller, thus for example when the vehicle travels over uneven ground and the intrinsic weight of the seat and therefore its resultant force vector no longer only has a vertical component, but also has a component in the axial direction.

In order to be able to prevent such play within the roller guide, for example, two rollers are arranged within the guide rail rather than one. However, such roller guides making use of at least two rollers are complex to manufacture and expensive.

Also known are rollers which are made as two-component rollers of plastics material and additional leaf spring-like elements, wherein the latter raise themselves up as soon as there is no seat occupancy or sufficient pressure is no longer present and thus provide for a play compensation. However, these rollers are also expensive.

SUMMARY

It is therefore an object of the invention to provide a vehicle seat with a roller guide which can be manufactured economically and easily and, in particular, allows a play compensation in the direction of a central axis of the running roller.

This object is achieved in accordance with the features of claim 1.

An essential point of the invention is that in a vehicle seat with a roller guide, wherein the roller guide has at least one at least partially laterally open guide rail and at least one running roller rolling in the guide rail and connected to parts of the vehicle seat by means of at least one axle, wherein the guide rail comprises a roller bottom-side inner wall arranged parallel to a central axis of the running roller, extending parallel thereto a roller top-side inner wall and a roller outer-side inner wall arranged perpendicularly to the central axis, wherein at least one lower transition inner wall is arranged between the roller bottom-side inner wall and the roller outer-side inner wall and at least one upper transition inner wall is arranged between the roller top-side inner wall and the roller outer-side inner wall, wherein the transition inner walls are configured free from a right-angled portion and in directions from the roller top-side inner wall and the roller bottom-side inner wall towards the roller outer-side inner wall are configured with a continuously reducing spacing from the central axis of the running roller, wherein on an axial loading of the roller guide in the direction of the central axis of the running roller, a lower portion of an outer end portion at a first end of the running roller configured facing the roller outer-side inner wall lies with contact against the lower transition inner wall.

By means of the described embodiment of the transition inner walls, it is thus ensured that these, in their function as counterbearings to the roller, always provide a bearing force which is characterised by an axial and a radial component. The roller is thus mounted in relation to both directions, that is, in the axial and in the radial direction wherein through the provision of the contact between the roller and the guide rail, provision is made simultaneously for axial and radial play compensation.

In the context of the invention, "radial loading" should be understood to mean that a force directed in the radial direction of the running roller acts on the roller guide. Similarly thereto, in the context of the invention, "axial loading" should be understood to mean that a force directed in the axial direction of the running roller acts on the roller guide.

By means of the form of the guide rail and the roller and their arrangement relative to one another, it is also ensured that in this loading case, the outer end portion lies in part against the guide rail. Since, on a change of the loading, the roller rotates within the guide rail, it is further ensured that different portions of the outer end portion always form the lower portion, which allows an even loading of the roller with regard to its overall lifespan.

In order to facilitate the production of the roller and to allow support which is as even as possible regardless of the angular position of the roller, it has proved to be advantageous if the outer end portion is configured, at least in a relaxed state of the running roller, to be rotationally symmetrical, preferably annular in relation to the central axis of the running roller. A relaxed state exists particularly if the running roller is not installed in the guide rail. If the running roller is installed in the guide rail, the outer end portion deforms according to the existing loading case; regardless thereof, however, it is preferably configured as a ring element formed to be continuous in the peripheral direction, wherein the spacing of the ring element from the central axis of the running roller can be configured differently in the peripheral direction dependent upon the existing loading case.

It has also proved to be advantageous if a shape of the lower transition inner wall and/or the upper transition inner wall is designed to be straight and/or arc-shaped. This corresponds to the design of conventional guide rails. Therefore, no complex special parts have to be manufactured; rather, already existing material can be made use of, so that it is possible to retrofit existing roller guide systems.

In order to ensure the simplest possible rolling of the roller within the guide rail, it is preferred that a roller cover of the running roller is rollable along the roller bottom-side inner wall of the guide rail, wherein the roller cover of the running roller is divided at least into a first cover surface functional region which forms the first end of the running roller and has the outer end portion, and a second cover surface functional region arranged therebehind in the direction of the axis of the running roller, said functional region forming a second end of the running roller facing away from the roller outer-side inner wall.

Through the formation of a roller cover, which with a correspondingly thin construction can also be designated as the outer cover and consists of two functional regions of which the first can be distorted in the radial direction, it is advantageously achieved that the roller is sufficiently compressed on its underside and is thus deformed in order to have on its upper side no more contact with the upper-side inner wall of the guide rail, and thus to allow a blocking-free rolling of the roller within the guide rail.

It has also proved successful if the first functional region is configured to be funnel-shaped and the second functional region is configured to be cylindrical. The running roller is thus advantageously divided into at least two controllable functional regions; that is, for example, into a rigid cylindrical form as a second functional region in a rigid or stiff embodiment and a resilient funnel form as the first functional region which has the function of the independent adaptation and elastic resilience. This adaptation or the elastic resilience can take place by means of a targeted deformation in the region of the first funnel-shaped functional region. The basis for this deformation are, for example, the material properties or the shape of the first functional region.

For the second functional region, a cylindrical form or, with regard to the cover surface configuration, a hollow cylindrical form can also be assumed.

The second functional region can also be configured to be conical. This means that the outer diameter of the second functional region is configured to increase evenly in the axial direction. Preferably, the largest outer diameter of the second functional region is in this case arranged at the end which, seen in the axial direction of the roller, is arranged facing towards the first functional region.

The first funnel-shaped functional region can in this case have different configurations. Thus, the funnel or the funnel-shape can be configured such that the outer and inner surface of the funnel, which simultaneously form its outer cover, extend parallel to one another, so that the funnel has a homogeneous wall thickness. However, the funnel can also have an inhomogeneous wall thickness. Seen in cross section, the edges which delimit the outer surface and/or the inner surface and which extend, seen in the axial direction of the roller, from one end of the funnel to the other end of the funnel, can extend straight or curved to the left or right, so that, for example, a bell-shaped funnel is formed.

Further, it is preferred that an outer diameter of the second functional region has an undersize in relation to a spacing between the roller top-side inner wall and the roller bottom-side inner wall. This applies, in particular, for a relaxed state of the roller. It is therefore ensured, in particular, that the second functional region comes into contact only with the roller bottom-side inner wall of the guide rail and does not block the rolling of the roller.

In a further loading case, specifically when neither an axial loading of the roller guide nor a radial loading of the roller guide by occupancy of the vehicle seat is present, it is advantageous if the first functional region presses so strongly against the roller bottom-side inner wall and the roller top-side inner wall of the guide rail such that the roller is blocked within the guide rail. The first functional region of the roller cover of the running roller is advantageously deformable by means of the radial loading.

In a further loading case, specifically on axial loading of the roller guide and without the radial loading, it is advantageous if an upper portion of the outer end portion lies with contact against the upper transition inner wall. As described above, in this case, the lower portion of the outer end portion naturally also lies with contact against the lower transition inner wall.

This loading case therefore applies particularly if the seat is not occupied by a seat occupant. In particular, in this loading case, all the remaining portions of the roller are arranged without contact on the guide rail, so that only the outer end portion is arranged with contact on the guide rail by means of the upper and lower portion. Thus a premature abrasion of the remaining portions or the entire roller is prevented. At the same time, it is ensured that the roller is arranged in a play-free manner within the guide rail, so that the roller distorts within the guide rail; a movement of the roller within the guide rail is therefore not possible in this state.

In the context of the invention, portions of the roller are arranged, in particular, in a freely rotating manner if they are arranged without contact on the guide rail. This applies in particular for the upper and lower portion of the outer end portion.

In order to ensure the rolling of the roller on seat occupancy, it has proved to be advantageous if on radial loading and without the axial loading, the first and second functional region are arranged lying with contact against the lower inner wall and without contact on the upper inner wall, wherein the outer end portion is arranged without contact on both transition inner walls. In this case, ideally therefore, the function of the transition inner walls as a counter bearing to the roller is not necessary.

In a combination of axial and radial loading, provision must be made firstly for play compensation in both directions and secondly to ensure the rolling capability of the roller. It is therefore advantageous if during the radial loading and the axial loading, the first and second functional region are arranged lying with contact against the lower inner wall and without contact on the upper inner wall. Furthermore, the upper portion of the outer end portion lies with contact against the upper transition inner wall.

However, as soon as the occupant leaves the seat and thus there is no longer any seat occupancy and no radial loading, the deformation of the roller reverses, so that a contact of the upper side of the roller with the roller top-side inner wall of the guide rail forms and the movement of the roller within the guide rail is braked so that the roller lies in a play-free manner within the guide rail.

On play-free application of the roller in this loading case, the roller is therefore also distorted within the guide rail; a movement of the roller within the guide rail is therefore also not possible in this state. It is thereby achieved that when the person occupying the seat leaves the seat, an upward movement of the seat is prevented and thus no trapping of the person between the steering wheel and the seat part front edge is possible.

Furthermore, a slight deformation capability of the running roller has proved to be advantageous when the first functional region is arranged surrounding a portion of the roller lying inwardly in the radial direction of the roller, wherein in the radial direction of the roller, a hollow cylindrically-formed cavity is arranged between the first functional region and the cylindrical portion.

In order to mount the shaft and the running roller as precisely as possible relative to one another, it is advantageous if the shaft is arranged as far as possible over the whole length of a bore accordingly arranged in the running roller, and the portion of the running roller positioned internally in the radial direction of the roller accordingly also forms the first and second end of the roller.

If, however, the most precise possible arrangement between the running roller and the guide rail is to be allowed, it can be advantageous if a first spacing between the roller outer-side inner wall and the outer end portion is less than a second spacing between the roller outer-side inner wall and an end face of the cylindrical portion. Thus the risk is reduced that the end face of the cylindrical portion makes unwanted contact with the roller outer-side inner wall, at least brakes the movement of the roller and possibly causes abrasion.

The roller is thus advantageously configured so that it is capable of compensating for dimensional differences in the profile by automatic adaptation to the spatial limitations in the profile. Rotation of the roller is only possible with difficulty in the play-free state. This state always arises as mentioned whenever no radial loading of the roller guide takes place.

By means of radial loading, the roller experiences a deformation with the result that the roller lies heavily on the profile at the bottom and, in the upper region, no longer makes contact with the profile. In this state, rotation of the roller is now possible.

In contrast to the second functional region, the first functional region has the task primarily of ensuring the braking and the absence of play of the roller within the guide rail or the homogenous rolling, wherein not the first but the second functional region has the main carrying function during rolling. The first functional region undergoes the deformation described above and thus is responsible, inter alia, for the running behaviour of the roller and the interaction between the roller and the guide rail.

Due to the undersize of the second functional region, it has no contact with the guide rail in the first function. If, however, the roller is compressed and the second function is evoked, the second functional region is also configured lying on the guide rail over its whole length, seen in the axial direction of the roller. It therefore provides a carrying and supporting function and represents the main running surface for the roller during rolling and, as described above, takes on the main carrying function during rolling of the roller. The second functional region thus forms the mechanical stabilisation or connection for the first functional region and is also responsible for ensuring a smooth running behaviour of the roller, and this becomes important in the deformed state of the roller.

A further advantage of the above-described fact that only a small proportion of the outer cover of the running roller makes any contact with the guide rail is that the roller outer surface is insensitive to tolerance variations since, for example, due to the described undersize of the second functional region and the low contact portion of the first functional region, a deviation of the target dimension of the outer contour does not lead, in most cases, to the above-described problems such as rattling sounds and the prevention of smooth low-noise rolling.

The design of the roller as described further leads to a play equalisation in the axial and radial direction so that disturbing sounds can be eliminated as far as possible.

Also, due to the low contact portion, there is lower sensitivity to depressions or cavitations, which can arise during production of the running roller.

Overall, the advantageous embodiment of the roller contour described therefore offers a high level of rolling safety, that is, a reliable cooperation between guide rail and running roller.

In practice, it has in this case proved to be advantageous if the first cover surface functional region of the running roller is arranged facing towards the roller outer-side inner wall of the guide rail.

A preferred embodiment provides that the running roller consists of a material which, aside from favourable mechanical properties such as high strength and stiffness with good toughness, high wear resistance and low coefficient of sliding friction, also has a favourable temperature resistance from, for example, −40° C. to approximately 100° C. Above all, the material must naturally be suitable, with regard to its elastic properties, to have the described spring-like properties. Thus it must be elastically deformable. This naturally applies above all for the first functional region, since this is deformable in a targeted way as described above and must be configured to be resilient. Furthermore, the material must have sufficient resistance against wear caused by the rolling movement.

Accordingly, it is, for example, advantageous if the first functional region and/or the second functional region consist of a resilient material.

An advantageous embodiment provides, for example, that the first functional region and/or the second functional region consist of a plastics material, in particular polyoxymethylene (POM).

It is also conceivable that only the first functional region consists of a resilient material such as plastics material, for example, POM. The second functional region can consist, for example, of a metal. It is conceivable that, during manufacturing, the first functional region is arranged round the remainder of the running roller by means of an injection moulding method.

If the roller is arranged in a play-free manner within the guide rail, this can be regarded, in particular, also as a blocking of the roller within the guide rail.

Through the formation of a running roller, for example, with a first and a second functional region (also called "duplex roller"), it is thus possible to use just one roller per roller mounting. This results in a manufacturing material saving and thus also a cost saving.

Advantageous embodiments are disclosed in the subclaims.

BRIEF DESCRIPTION OF THE DRAWINGS

Further advantages and functionalities may be derived from the following description in conjunction with the drawings.

In the drawings.

DETAILED DESCRIPTION

Figure 1:
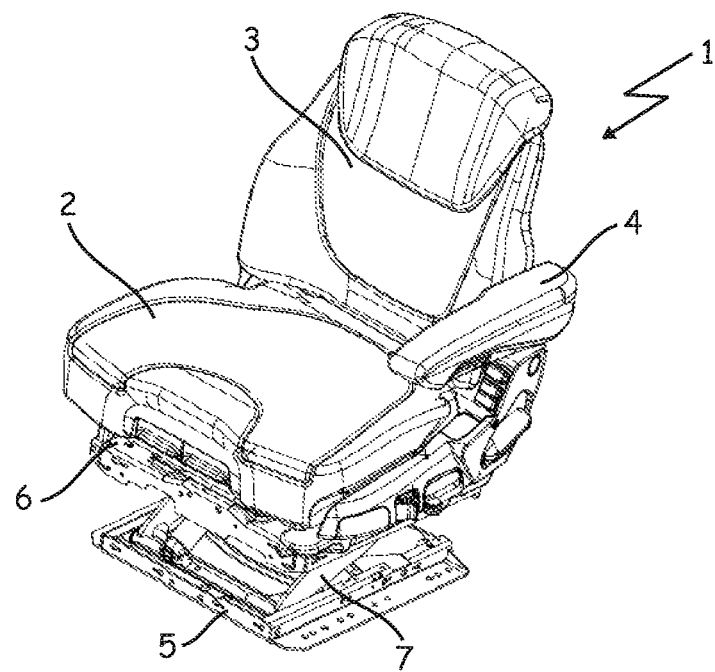
FIG. 1 is a schematic perspective view of a vehicle seat.

FIG. 1 is a perspective view of a vehicle seat 1 with a seat part 2, a backrest 3 and an armrest 4. A lower part 5 of the vehicle seat 1 is connected to an upper part 6 by means of scissor arms 7, wherein the lower part 5 and the upper part 6 can move towards one another, in the form that the upper part 6 is mounted such that it can pivot relative to the lower part 5. Such scissor frames and their functioning are well known from the prior art.

Figure 2:
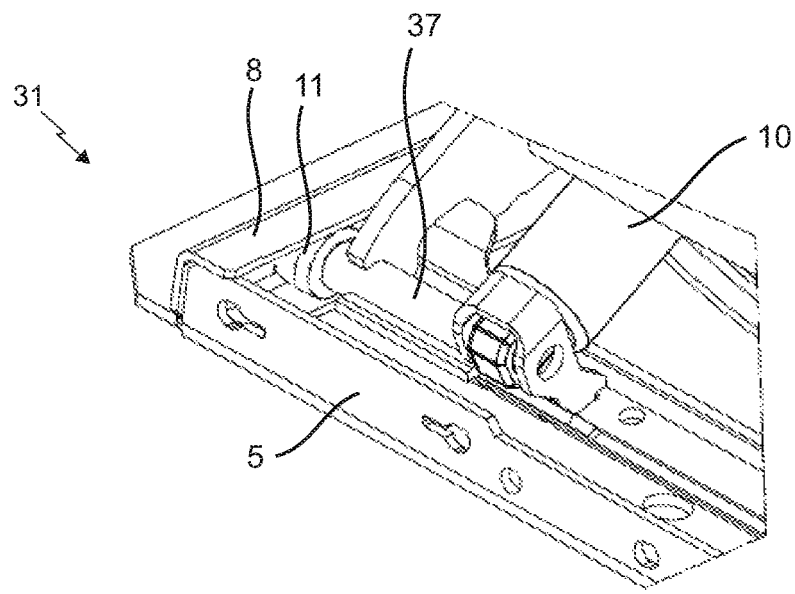
FIG. 2 is a perspective partial view of a portion of the vehicle seat according to the present invention with parts of the roller guide.

In order to be able to allow the scissor arms to pivot up and down, they must be arranged to be movable at least in part, including at their lower ends, in the vehicle longitudinal direction, that is in forward and rearward directions. For this purpose, roller guides 31 are provided, wherein FIG. 2 shows one roller guide 31. Shown in FIG. 2 is a partially laterally open guide rail 8 which is preferably configured to be substantially C-shaped or U-shaped in cross section and within which rollers 11, in this case one roller 11, is/are rollably mounted. The roller 11 is arranged on an axle 37 to which in turn parts of the vehicle seat 1 are fastened, for example, a damper 10 which is to exert a damping influence on the upward and downward movement of the vehicle seat 1, that is, the upper part 6 relative to the lower part 5.

Figure 3:
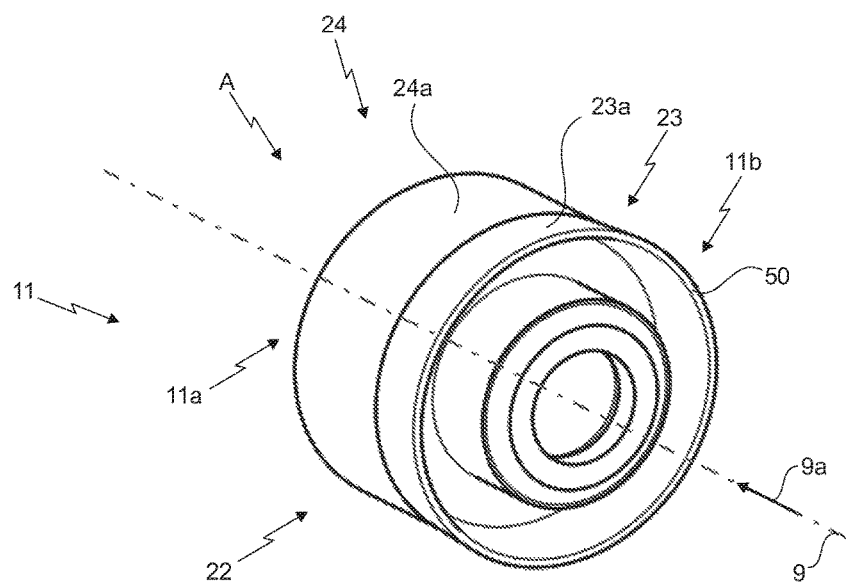
FIG. 3 is a perspective view of an embodiment of the running roller according to the invention in a relaxed state.

FIG. 3 is a perspective view of an embodiment of the running roller 11 according to the invention in a relaxed state A, that is, not installed in a guide rail 8. This roller 11 has a roller cover 22 which is subdivided into a first cover surface functional region 23 with an outer surface 23a and a second cover surface functional region 24 with an outer surface 24a. The second functional region 24 is arranged in the direction 9a of the axis 9 of the running roller 11 behind the first functional region 23.

As shown here, the first functional region 23 is configured to be substantially funnel-shaped and also forms a first end 11b of the running roller 11 and comprises an outer end portion 50. This outer end portion 50 is configured to be rotationally symmetrical at least in this relaxed state A of the running roller 11 in relation to the central axis 9 of the running roller 11 and in this case is annular.

Furthermore, the second cover surface functional region 24 is configured to be cylindrical and forms a second end 11a of the running roller 11.

Figure 4:
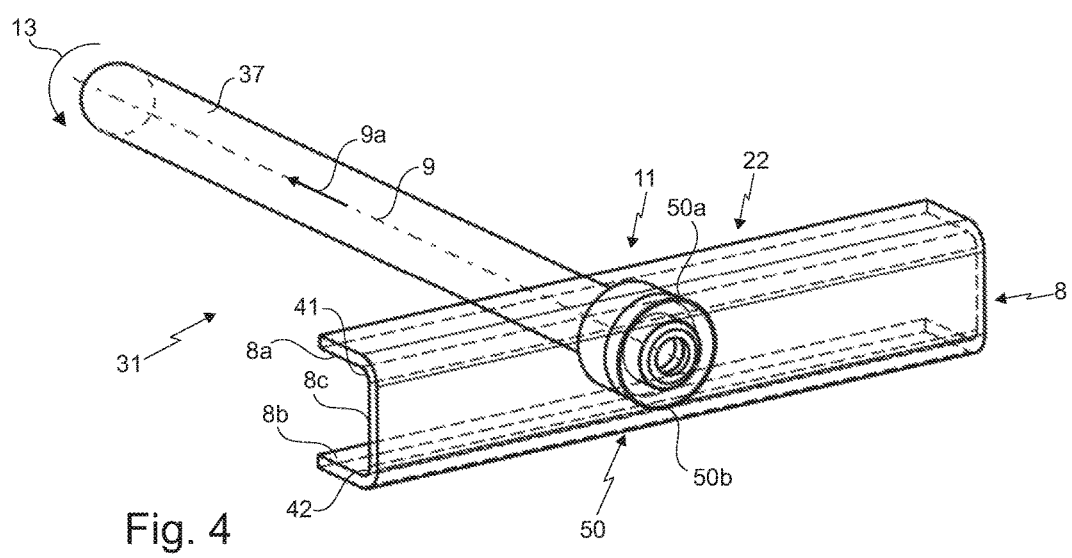
FIG. 4 is a cross section of a guide rail and an embodiment of the running roller according to the invention.

In FIG. 4, in a perspective drawing, a U-shaped guide profile or a guide rail 8 is shown with a roller top-side inner wall 8a, a roller bottom-side inner wall 8b and a roller outer-side inner wall 8c. Furthermore, transition inner walls 41, 42 are arranged between the inner walls 8a, 8c and 8b, 8c.

It can be seen from this drawing that the roller 11, when it moves leftwards—viewed in the image plane—that is, carries out a rolling movement as per the curved arrow 13, rolls by means of its roller cover 22 along the underside inner wall 8b. The axis 9 naturally moves together with the roller 11 in this direction.

Figure 5A:
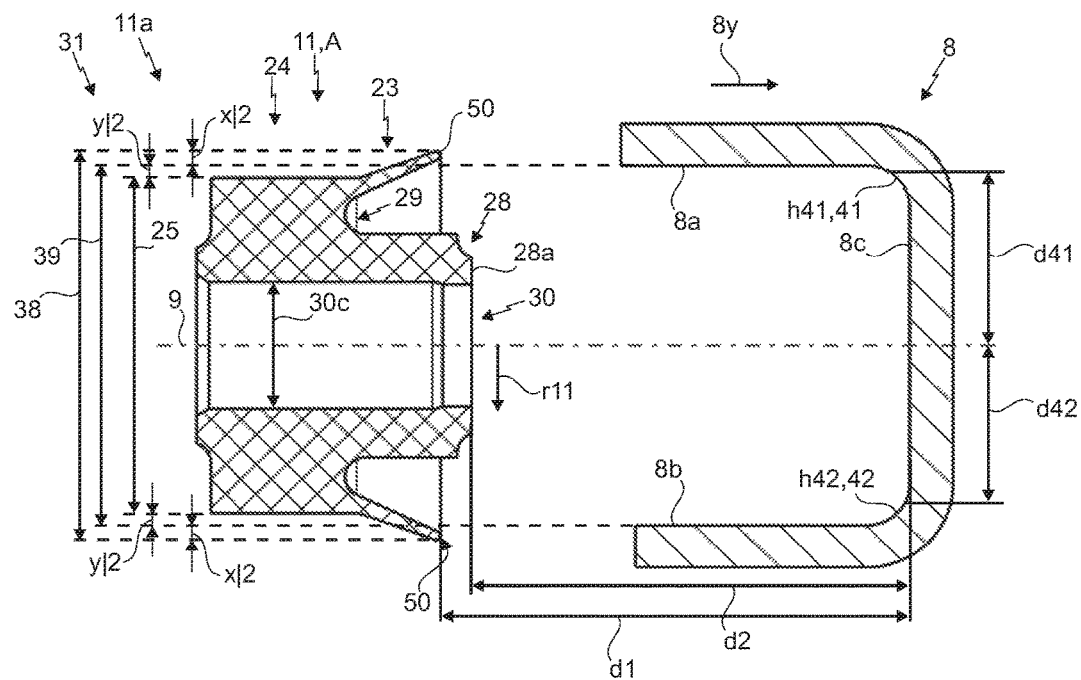
FIG. 5a is a cross section of a first embodiment of the roller guide according to the invention.
Figure 5B:
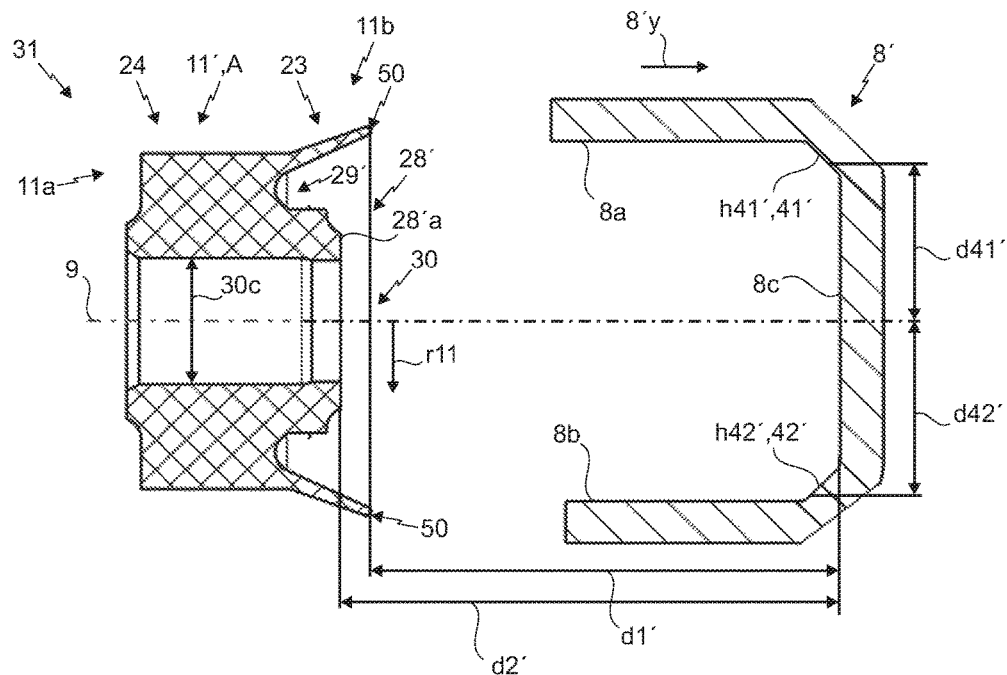
FIG. 5b is a cross section of a second embodiment of the roller guide according to the invention.

FIGS. 5a and 5b show a first and a second embodiment of the present roller guide 31 wherein components configured identically or substantially identically are provided with identical reference signs.

In both embodiments, there is an at least partially laterally open guide rail 8; 8', which is in each case configured to be substantially C-shaped, and a running roller 11; 11', wherein for reasons of clarity, the guide rail 8; 8' and the running roller 11; 11' are shown in the disassembled state and the running roller 11; 11' in particular is shown in the relaxed state A. The running roller 11; 11' and in particular the running roller 11 according to FIG. 5a are configured herein substantially in accordance with the running roller 11 of FIG. 3.

The aperture dimension of the guide rails 8; 8' is the respective spacing 25 between the roller top-side inner wall 8a and the roller bottom-side inner wall 8b extending parallel thereto. In a comparison of the cross section of the running rollers 11, 11' with the cross section of the guide rail 8, 8', it is made clear that the outer diameter 38 of the first cover surface functional region 23 in relation to the spacing 25 has, at least in part, an oversize x and the outer diameter 39 of the second cover surface functional region 24 has an undersize y relative to the spacing 25. In FIG. 5a, this is illustrated by the distances x/2 and y/2 which correspond in each case to half of the actual oversize x or of the undersize y.

Advantageously, the portion which has the oversize x relative to the spacing 25 includes the outer end portion 50 at least in part, preferably entirely.

Since the spacing 25 and the outer diameters 38, 39 are the same in both embodiments, the description above relating to oversize x and undersize y applies to both embodiments, even if it is described only in accordance with FIG. 5a.

In both embodiments, the guide rail 8; 8' has a roller bottom-side inner wall 8b arranged parallel to a central axis 9 of the running roller 11; 11', a roller top-side inner wall 8a extending parallel thereto and a roller outer-side inner wall 8c arranged perpendicularly to the central axis 9, wherein arranged between the roller bottom-side inner wall 8b and the roller outer-side inner wall 8c is a lower transition inner wall 42; 42' and arranged between the roller top-side inner wall 8a and the roller outer-side inner wall 8c is an upper transition inner wall 41; 41'.

In both embodiments, the transition inner walls 41, 42; 41', 42' are free from a perpendicular portion and in the directions 8y, 8'y from the roller top-side inner wall 8a and from the roller bottom-side inner wall 8b towards the roller outer-side inner wall 8c, are each configured with a continuously reducing spacing d41, d42; d41', d42' from the central axis 9 of the running roller 11; 11'. The spacings d41, d42; d41', d42' are in each case drawn in by way of example at a selected site in the direction 8y, 8'y. Since the central axis 9 of the running roller 11; 11' is also arranged parallel to the roller top-side inner wall 8a and to the roller bottom-side inner wall 8b in the installed state (see in particular FIG. 6a-6d), the above description also applies for the disassembled state shown.

Furthermore, it can also be seen that in both embodiments, the first functional region 23 of the running roller 11; 11' is arranged surrounding a portion 28; 28' of the running roller 11; 11' lying inwardly in the radial direction r11 of the roller 11; 11', wherein in the radial direction r11 of the running roller 11; 11' a hollow cylindrically-formed cavity 29; 29' is arranged between the first functional region 23 and the cylindrical portion 28; 28'. The roller 11, 11' has a cylindrical cavity 30 with a diameter 30c in the core region for accommodating a component which is to form the running axle 37 of the roller 11, 11'.

The first difference between these two embodiments is that in the first embodiment shown in FIG. 5a, the shape h41, h42 of the lower 41 and the upper transition inner wall 42 is arc-shaped in each case. In contrast thereto, in the second embodiment shown in FIG. 5b, the shape h41', h42' of the lower 41' and the upper transition inner wall 42' is substantially straight. It is conceivable that the shape h41', h42' is provided only on the respective transition to the roller top-side inner wall 8a and to the roller bottom-side inner wall 8b is provided with a radius and thus in this portion would be arc-shaped.

The second difference between these two embodiments is that in the first embodiment according to FIG. 5a, a first spacing d1 between the roller outer-side inner wall 8c and the outer end portion 50 is greater than a second spacing d2 between the roller outer-side inner wall 8c and an end face 28a of the cylindrical portion 28 of the running roller 11. Contrasted thereto is that in the second embodiment according to FIG. 5b, a first spacing d1' between the roller outer-side inner wall 8c and the outer end portion 50 is less than a second spacing d2' between the roller outer-side inner wall 8c and an end face 28'a of the cylindrical portion 28' of the running roller 11'.

Since both the embodiments shown of the running roller 11; 11' and both the embodiments shown of the guide rail 8; 8' can be combined with one another as desired, overall, apart from the two combination possibilities shown in FIGS. 5a and 5b, at least two further combination possibilities exist.

FIG. 6a-6d each show the running roller 11 and the guide rail 8 of FIG. 5a in the assembled state, but form different loading cases of the roller guide 31 or states B, C1, C2 and C3 of the running roller 11. For better clarity, in FIG. 6a-6d, the portions of the guide rail which have the inner walls 8a, 8b, 8c are each separated by a dashed line from the portions of the guide rail which have the transition inner walls 41, 42.

Figure 6A:
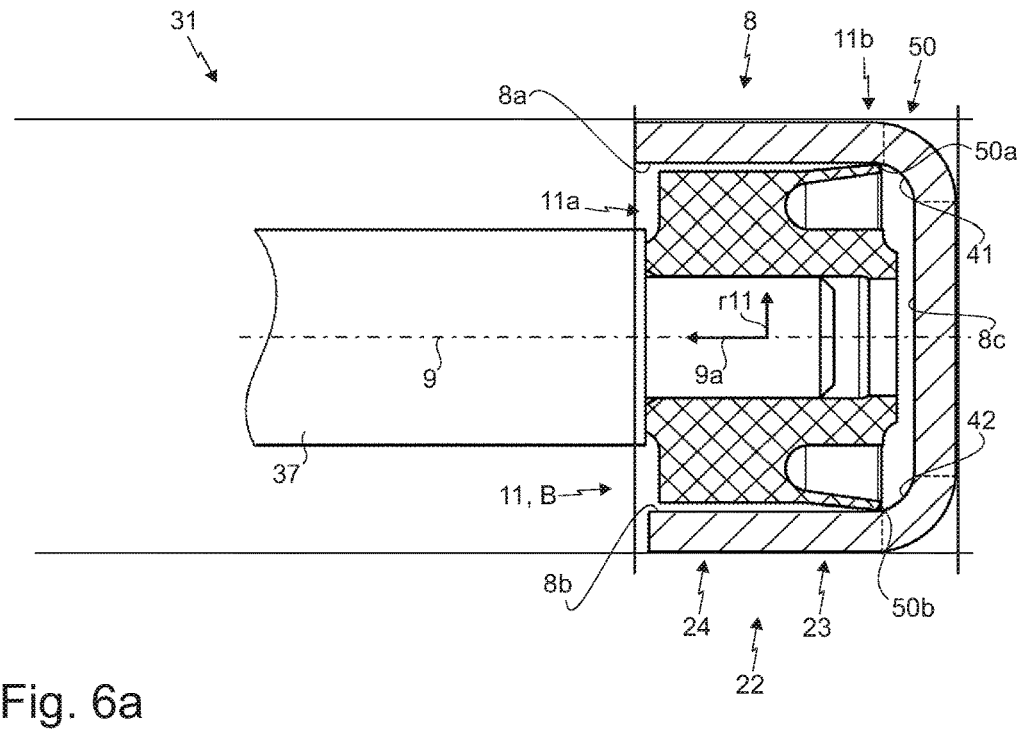
FIG. 6a is a cross section of the roller guide according to the invention without radial and axial loading.

In FIG. 6a, the running roller 11 is installed in the guide rail 8 and is thus deformed with respect to the first functional region 23, so that in contrast to the unloaded and relaxed state A according to FIG. 3, the running roller 11 is present here in an installed and distorted state B. However, apart from the installation conditions shown and the intrinsic weight of the roller guide, no further loading acts on the roller guide 31 in the form of an axial loading FA or a radial loading FR.

The first functional region 23 presses, as shown without the existence of a radial loading FR and an axial loading FA, so strongly against the roller bottom-side inner wall 8b and the roller top-side inner wall 8a of the guide rail 8 that the roller 11 is blocked within the guide rail 8. This is the case if the seat occupant leaves the seat 1 and there is therefore no longer a seat occupancy; accordingly also, a sufficient pressure application no longer exists for the roller 11 in order to deform it sufficiently on its underside in contact with the roller bottom-side inner wall 8b of the guide rail 8 (see FIG. 6c).

Therefore a contact of the upper side of the roller 11 with the roller top-side inner wall 8a of the guide rail 8 is formed, so that the movement of the roller 11 within the guide rail 8 is braked and the roller 11 lies in a play-free manner within the guide rail 8. In particular, in this loading case, the roller 11 is arranged without contact in relation to the transition inner walls 41, 42.

By means of such braking of the roller 11 within the guide rail 8, it is achieved that when the person occupying the seat leaves the seat, an upward movement of the seat is prevented and thus no trapping of the person between the steering wheel and the seat part front edge is possible.

Figure 6B:
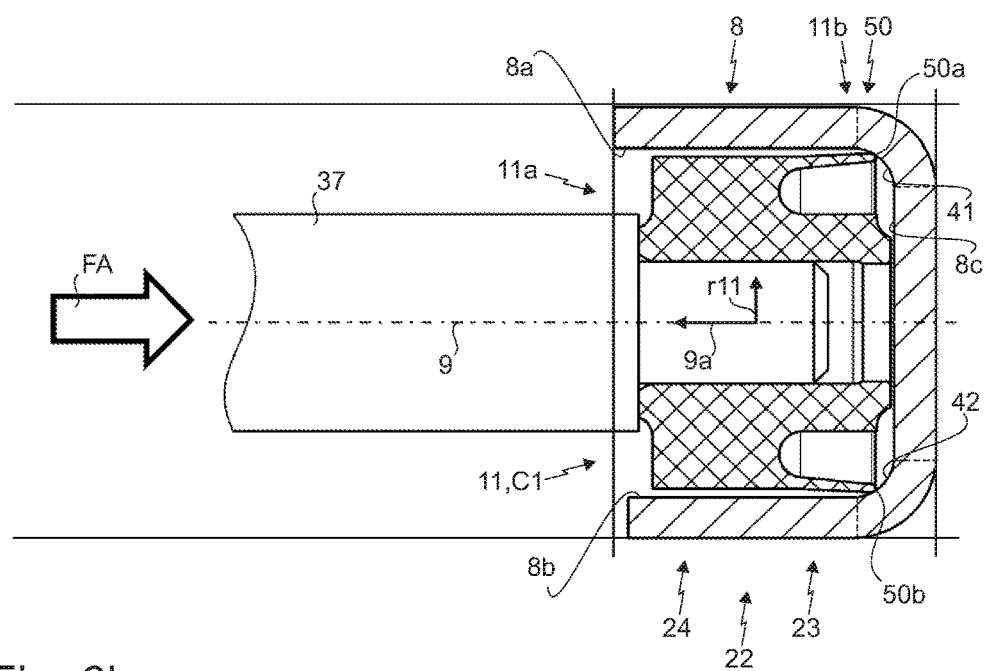
FIG. 6b is a cross section of the roller guide according to the invention without radial loading and with axial loading.

In FIG. 6b, the running roller 11 is installed in the guide rail 8 and is thus deformed with respect to the first functional region 23. In addition, an axial loading FA acts on the roller guide 31 and therefore on the running roller 11, so that the running roller 11 is present here in an installed and distorted and axially loaded state C1.

As can be seen, in this loading case, that is, on axial loading FA of the roller guide 31 in the direction of the central axis 9 of the running roller 11 and without a radial loading FR of the roller guide 31 by seat occupancy of the vehicle seat 1, the outer end portion 50 configured on the first end 11b of the running roller 11 facing towards the roller outer-side inner wall 8c lies with contact against both transition inner walls 41, 42 by means of the portions 50a and 50b. Provision is therefore made for play compensation in the axial direction 9a.

Figure 6C:
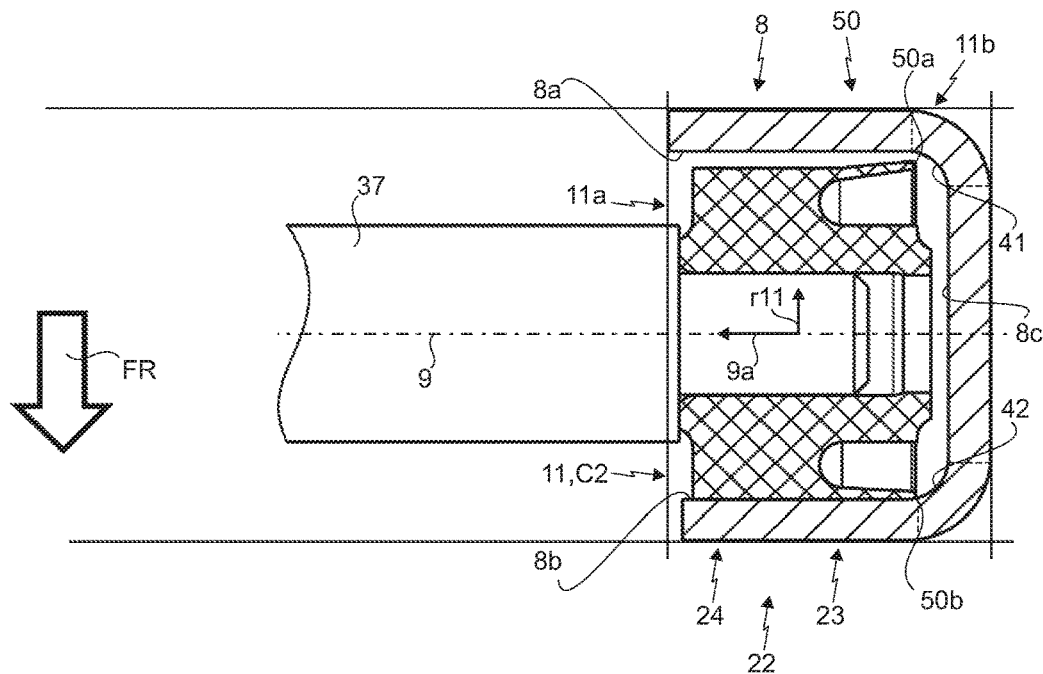
FIG. 6c is a cross section of the roller guide according to the invention with radial loading and without axial loading.

In FIG. 6c, the running roller 11 is installed in the guide rail 8 and is thus deformed with respect to the first functional region 23. In addition, in the present case, a radial loading FR acts on the roller guide 31 and therefore on the running roller 11, so that the running roller 11 is present here in an installed and distorted and radially loaded state C2. Thus, this loading case corresponds to the state shown in FIG. 4 wherein a pressure application according to the arrow FR takes place, for example, by means of seat occupancy by a person. An axial loading FA, however, is not present.

In the loading case shown, the roller 11 is pressed downwards and experiences a deformation of its underside which represents the side of contact on the bottom-side inner wall 8b of the guide rail 8. Thus the roller 11 is freed at its upper side, that is, relative to the upper-side inner wall 8a of the guide rail 8.

At the same time, the roller 11 is compressed at its region of contact at the roller bottom-side inner wall 8b, so that it is pressed upwards in this region. Here, both the first functional region 23 and also the second functional region 24 lie, seen over their entire length in the axial direction 9a of the roller 11, against the bottom-side inner wall 8b of the guide rail 8, so that rolling of the roller 11 is allowed.

It is shown in FIG. 6c that on radial loading FR and without the axial loading FA, the first 23 and the second functional region 24 lie with contact against the lower inner wall 8b and without contact on the upper inner wall 8a, wherein the outer end portion 50 is arranged without contact on both transition inner walls 41, 42. It is further apparent that the first functional region 23 is deformable by the radial loading FR.

Figure 6D:
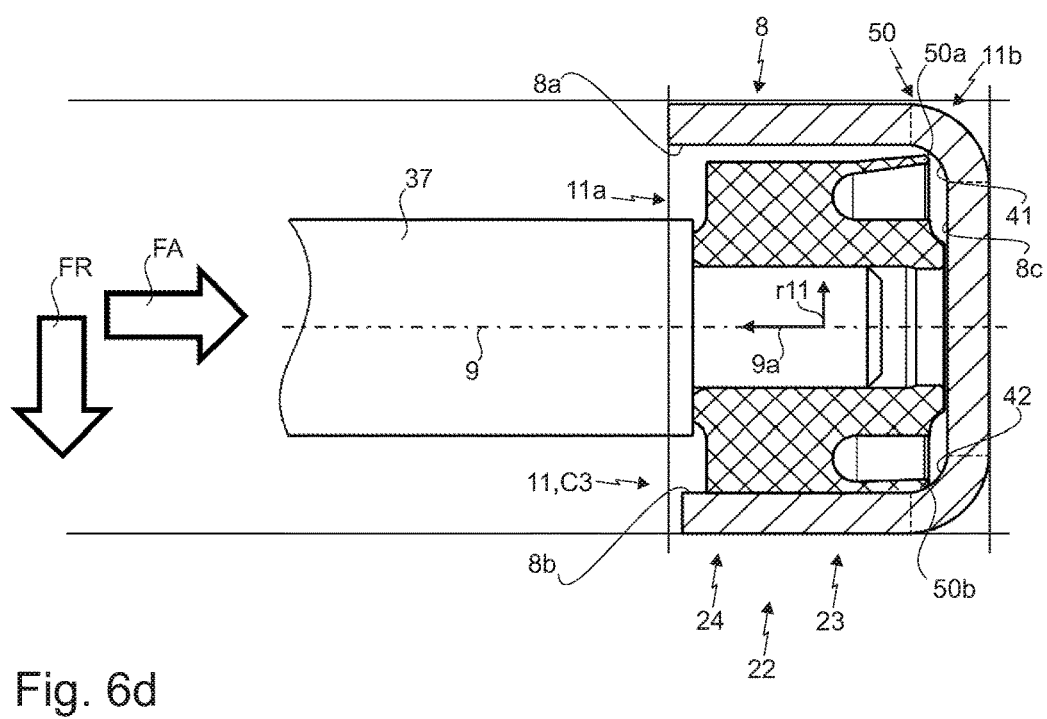
FIG. 6d is a cross section of the roller guide according to the invention with radial and axial loading.

In FIG. 6d, the running roller 11 is installed in the guide rail 8 and is thus deformed with respect to the first functional region 23. In addition, the radial loading FR and the axial loading FA therefore act here on the roller guide 31 and therefore on the running roller 11, so that the running roller 11 is present here in an installed and distorted and radially loaded and axially loaded state C3.

As shown in the loading case of FIG. 6c, the roller 11 is pressed downwards by the radial loading FR and experiences the above-described deformation of its underside, so that finally, rolling of the roller 11 is allowed.

It is also apparent from FIG. 6*d* that on radial loading FR and axial loading FA, the first 23 and the second functional region 24 lie with contact against the lower inner wall 8*b* and without contact on the upper inner wall 8*a*, wherein the outer end portion 50 is arranged by means of the lower end portion 50*b* lying with contact against the lower transition inner wall 42. In relation to the upper transition inner wall 41, however, the outer end portion 50 is arranged without contact.

In particular, therefore, the application of the axial loading FA leads to a contact between at least the lower transition inner wall 42 and at least the lower portion 50*b* of the outer end portion 50, since the roller guide 31 as a whole is advantageously configured so that without the axial loading FA, the roller 11 lies against the roller bottom-side inner wall 8*b* and the roller top-side inner wall 8*a* and is arranged directly adjoining the transition inner walls 41, 42 (as shown in FIGS. 6*a* and 6*c*).

All the features disclosed in the application documents are claimed as essential to the invention, provided they are novel over the prior art individually or in combination.

LIST OF REFERENCE SIGNS

1 Vehicle seat
2 Seat part
3 Backrest
4 Armrest
5 Lower part
6 Upper part
7 Scissor arms
8; 8' Guide rail
8*a* Roller top-side inner wall
8*b* Roller bottom-side inner wall
8*c* Roller outer-side inner wall
8*y*; 8'*y* Direction
9 Central axis
9*a* Axial direction
10 Damper
11; 11' Roller/running roller
11*a*, 11*b* End
12 Arrow/pressure application
13 Curved arrow
19 Running surface
22 Roller cover
23, 24 Functional region
23*a* Outer surface
24*a* Outer surface
25 Spacing
28; 28' Portion
28*a*, 28'*a* End face
29, 29' Cavity
30 Cavity
30*c* Diameter
31 Roller guide
37 Axle
38, 39 Outer diameter
41, 42, 41', 42' Transition inner wall
50 Outer end section
50*a*, 50*b* Portion
d1, d2, d1', d2', d41, d42, d41', d42' Spacing
FA Axial loading
FR Radial loading
h41, h42, h41', h42' Shape
r11 Radial direction
x Oversize
x/2, y/2 Distance
y Undersize

The invention claimed is:

1. A vehicle seat with a roller guide, wherein the roller guide has at least one at least partially laterally open guide rail and at least one running roller rolling in the guide rail and connected to parts of the vehicle seat by means of at least one axle, wherein the guide rail comprises a roller bottom-side inner wall arranged parallel to a central axis of the running roller, extending parallel thereto a roller top-side inner wall and a roller outer-side inner wall arranged perpendicularly to the central axis,
    wherein at least one lower transition inner wall is arranged between the roller bottom-side inner wall and the roller outer-side inner wall and at least one upper transition inner wall is arranged between the roller top-side inner wall and the roller outer-side inner wall,
    wherein the transition inner walls are configured free from a right-angled portion and in directions from the roller top-side inner wall and the roller bottom-side inner wall towards the roller outer-side inner wall are configured with a continuously reducing spacing from the central axis of the running roller,
    wherein on an axial loading of the roller guide in a direction of the central axis of the running roller, a lower portion of an outer end portion at a first end of the running roller configured to face the roller outer-side inner wall lies with contact against the lower transition inner wall, and
    wherein a roller cover of the running roller is rollable along the roller bottom-side inner wall of the guide rail, wherein the roller cover of the running roller is configured at least into a first cover surface functional region which forms the first end of the running roller and has the outer end portion, and a second cover surface functional region arranged therebehind in the direction of the axis of the running roller, said second functional region forming a second end of the running roller facing away from the roller outer-side inner wall.

2. The vehicle seat according to claim 1, wherein the outer end portion is configured, at least in a relaxed state of the running roller, to be rotationally symmetrical, preferably annular, in relation to the central axis of the running roller.

3. The vehicle seat according to claim 1, wherein a shape of at least one of the lower transition inner wall and/or the upper transition inner wall is arc-shaped.

4. The vehicle seat according to claim 1, wherein the first functional region is configured to be funnel-shaped and the second functional region is configured to be cylindrical.

5. The vehicle seat according to claim 1, wherein an outer diameter of the second functional region has an undersize (y) in relation to a spacing between the roller top-side inner wall and the roller bottom-side inner wall.

6. The vehicle seat according to claim 1, wherein the first functional region of the roller cover of the roller is deformable by means of a radial loading of the roller guide due to seat occupancy of the vehicle seat and without the radial loading and the axial loading of the roller guide, presses so strongly against the roller bottom-side inner wall and the roller top-side inner wall of the guide rail that the roller is blocked within the guide rail.

7. The vehicle seat according to claim 1, wherein on axial loading of the roller guide and without the radial loading, an upper portion of the outer end portion lies with contact against the upper transition inner wall.

8. The vehicle seat according to claim 1, wherein on radial loading and without the axial loading, the first and the second functional regions lie with contact against the lower inner wall and without contact on the upper inner wall, wherein the outer end portion is arranged without contact on both transition inner walls.

9. The vehicle seat according to claim 1, wherein on radial loading and axial loading, the first and the second functional regions lie with contact against the lower inner wall and without contact on the upper inner wall.

10. The vehicle seat according to claim 1, wherein the first functional region is arranged surrounding a portion of the running roller lying inwardly in a radial direction of the roller, wherein in the radial direction of the roller, a hollow cylindrically-formed cavity is arranged between the first functional region and the cylindrical portion.

11. The vehicle seat according to claim 10, wherein a first spacing between the roller outer-side inner wall and the outer end portion is less than a second spacing between the roller outer-side inner wall and an end face of the cylindrical portion.

12. The vehicle seat according to claim 1, wherein a shape of at least one of the lower transition inner wall and the upper transition inner wall is straight.

* * * * *